United States Patent Office 3,418,354
Patented Dec. 24, 1968

3,418,354
PROCESS FOR PRODUCING GRAFT COPOLYMERS
Marshall L. Wheeler, Jr., Tonawanda, N.Y., assignor to Union Carbide Corporation, a corporation of New York
No Drawing. Continuation-in-part of application Ser. No. 356,944, Apr. 2, 1964. This application Dec. 29, 1964, Ser. No. 422,038
13 Claims. (Cl. 260—448.2)

ABSTRACT OF THE DISCLOSURE

This invention relates to a process for producing olefin-polyoxyalkylene graft copolymers which process comprises slowly and simultaneously adding (a) an olefin and (b) a peroxide containing a peroxide group linked to a tertiary carbon atom to (c) a polyoxyalkylene compound which is maintained at a temperature sufficiently elevated to cause a graft copolymer of the olefin and the polyoxyalkylene compound to be produced. Preferred polyoxyalkylene compounds include siloxane-polyoxyalkylene copolymers. The olefin can be a vinylsilicon compound or an organic olefin such as styrene. The invention also relates to fluoro-olefin-polyoxyalkylene graft copolymers having a unique structure (only one molecule of the olefin attaches to a given grafting site on the polyoxyalkylene compound).

---

This application is a continuation-in-part of application Ser. No. 356,944, filed Apr. 2, 1964, now abandoned.

This invention relates to graft copolymers and more particularly to a process for producing copolymers of olefins and polyoxyalkylene compounds by a grafting reaction.

Processes for producing copolymers by grafting olefins to other organic compounds are, in general, well known. However, the processes provided to date for producing graft copolymers from olefins, particularly from olefins that readily homopolymerize, and organic compounds of the polyoxyalkylene variety (e.g. polyethylene oxides) are not entirely satisfactory. Such known processes for producing olefin-polyoxyalkylene graft copolymers involve reacting an olefin and a polyoxyalkylene compound in the presence of a catalyst or free radical generator such as an azo compound or a peroxide (benzoyl peroxide). Satisfactory yields of the desired copolymer are not produced in such processes and the reason for the failure to produce satisfactory yields is apparently due to the type of catalyst or free radical generator employed. Thus, when azo compounds are employed in such grafting reactions with certain olefins (e.g. styrene), very little graft copolymer and relatively large amounts of homopolymerized olefin are produced, apparently due to the inability of the azo compound or the olefin to abstract a hydrogen atom to any significant extent from the polyoxalkylene compound. Such an abstraction of hydrogen is a prerequisite for graft copolymerization to occur. Further, when certain organic peroxides (e.g. acyl peroxides, such as benzoyl peroxide) are employed in such grafting reactions, little graft copolymerization occurs apparently due to the decomposition of the peroxide caused by the polyoxyalkylene compound. When large amounts of still other peroxides (i.e. alkyl peroxides, such as di-tertiary-butyl peroxide) are employed in such grafting reactions at low olefin concentrations, again little of the desired graft copolymer is produced since these peroxides cause undesirable interreactions between the polyoxyalkylene molecules. Moreover, under certain conditions, alkyl peroxides cause formation of relatively large amounts of homopolymer derived from the olefin.

Moreover, when siloxanes containing a plurality of olefinic groups are grafted to polyoxyalkylene compounds by the methods conventionally used in grafting reactions involving organic olefins, gels rather than more useful fluid products are produced.

It is an object of this invention to provide a process for producing good yields of useful graft copolymers of olefins, especially olefins that readily polymerize, and olefinic siloxanes containing a plurality of olefinic groups, and polyoxyalkylene compounds.

This invention is based on the discovery that good yields of olefin-polyoxyalkylene graft copolymers can be produced by slowly and simultaneously adding (a) an olefin and (b) a peroxide containing a peroxide group (—OO—) linked to a tertiary carbon atom to (c) a polyoxyalkylene compound which is maintained at a temperature sufficiently elevated to cause the grafting reaction to occur. The olefin and the peroxide can be premixed and the premixture added to the polyoxyalkylene compound or they can be added separately and simultaneously to the polyoxyalkylene compound.

A preferred embodiment of this invention provides a process for producing olefin-polyoxyalkylene graft copolymers by (1) forming an admixture of (a) a readily homopolymerizable olefin (or a siloxane containing at least two olefinic groups) free of polyoxyalkylene groups and (b) a catalytic amount of a peroxide having the formula:

$$Z_3COOZ'$$

wherein Z is an alkyl group or a phenyl group and Z' is hydrogen or $-CZ_3$ and then (2) forming a reaction mixture by slowly adding said admixture to a polyoxyalkylene compound free of aliphatic unsaturation at a rate such that the ratio of the weight of unreacted olefin in the reaction mixture to the total weight of unreacted polyoxyalkylene compound and copolymer in the reaction mixture does not exceed 1:5 (preferably 1:100) while (3) maintaining the polyoxyalkylene compound at a temperature at which the grafting reaction occurs.

This invention is generally applicable to grafting reactions involving polyoxyalkylene compounds and a wide variety of readily homopolymerizable olefinic compounds. Such olefinic compounds should preferably be free of polyoxyalkylene groups to avoid intra-molecular reactions. Suitable olefins include hydrocarbon olefins (e.g. styrene, chlorostyrene), olefinic nitriles (e.g. acrylonitrile, methacrylonitrile), alkenyl esters of alkanoic acids (e.g. vinyl acetate, vinyl propionate, vinyl butyrate), alkyl acrylate (e.g. methyl acrylate and ethyl acrylate), alkyl methacrylates (e.g. methylmethacrylate and ethylmethacrylate), unsaturated aliphatic acids (e.g. acrylic acid and methacrylic acid). Preferred argonic olefins are acrylonitrile, styrene and ethyl acrylate. These preferred olefins produce clear and hazeless graft copolymers containing small amount (e.g. less than 2 weight percent) homopolymerized olefin. Those graft copolymers from styrene form water-soluble graft copolymers with water-soluble polyoxyalkylene compounds (provided the amount of styrene in the copolymer did not exceed 35 weight percent).

Among the olefins useful as reactants in this invention are siloxanes containing at least two olefinic groups. Such siloxanes include those consisting essentially of at least two groups having the formula:

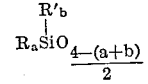

$$R_aSiO_{\frac{4-(a+b)}{2}}^{R'_b}$$

wherein R is an olefinically unsaturated monovalent hydrocarbon group, R' is a monovalent hydrocarbon group free of aliphatic (olefinic or acetylenic) unsaturation, $a$ has a value from 1 to 3 inclusive, $b$ has a value from 0

2 inclusive, and $(a+b)$ has a value from 1 to 3 inclusive.

Illustrative of the groups represented by R in Formula A are the alkenyl groups (e.g. the vinyl, alkyl, methallyl, and butenyl groups), and the alkenylaryl groups (e.g. the vinyl phenyl group, $CH_2=CHC_6H_5$—). Illustrative of the groups represented by R' in Formula A are the alkyl groups (e.g. the methyl, ethyl, propyl, and butyl groups), the aryl groups (e.g. the phenyl and naphthyl groups), the aralkyl groups (e.g. the beta-phenyl-ethyl groups).

Useful olefin reactants of the siloxane variety also include siloxanes consisting essentially of from 2 to 98 mole percent (preferably from 10 to 40 mole percent) of groups represented by Formula A and from 2 to 98 mole percent (preferably from 60 to 90 mole percent) of groups having the formula

(B)

wherein R' has the meaning defined in Formula A and $c$ has a value from 1 to 3 inclusive.

The above-described siloxanes that are useful in this invention can contain unhydrolyzed groups (e.g. acetoxy groups) as end-blocking groups.

From the above description of the olefin reactants employed in this invention, it is apparent that such olefins are alpha-olefins.

This invention is generally applicable to grafting reactions between the above-described olefins and a wide variety of polyoxyalkylene compounds (i.e. compounds containing at least two successive oxyalkylene groups). Such polyoxyalkylene compounds should preferably be free of aliphatic unsaturation to avoid intra-molecular reactions. Among the suitable polyoxyalkylene compounds are those represented by the formula:

$$R''[(OC_nH_{2n})_zOR']_a \qquad (C)$$

wherein R'' is a hydrocarbon radical free of aliphatic unsaturation and having a valence of $a$, $a$ is an integer having a value of at least one (preferably from 1 to 4 inclusive), R' is a monovalent hydrocarbon radical free of aliphatic unsaturation, or a hydrogen atom or an acyl radical free of aliphatic unsaturation (e.g. acetyl, $C_6H_5CO$—, propionyl, etc.), $n$ has a value from 2 to 4 inclusive, $z$ is an integer having a value from 0 to 200 inclusive (preferably from 2 to 120), provided that at least one number represented by $z$ has a value of at least 2 (preferably at least 5). Preferably, the polyoxyalkylene compounds represented by the latter formula have molecular weights from 100 to 10,000 (more preferably these compounds have molecular weights from 200 to 6000). These polyoxyalkylene compounds are usually produced by reacting an alkylene oxide or a mixture of alkylene oxides with an alcohol. Such alcohols can be monohydric or polyhydric and accordingly correspond to the formula $R''(OH)_a$ where R'' and $a$ have values defined for Formula C. Such alcohols include methanol, ethanol, propanol, butanol, ethylene glycol, glycerol, the monoethyl ether of glycerol, the dimethyl ether of glycerol, sorbital, 1,2,6-hexanetriol, trimethylolpropane, and the like.

Also included among the polyoxyalkylene compounds that can be employed as reactants in this invention are silane ethers and siloxane ethers. The silane ethers and siloxane ethers used as reactants in this invention include a wide variety of materials characterized by the presence of a silicon-containing moiety and an ether moiety and further characterized by the absence of silicon-bonded hydrogen atoms and aliphatic unsaturation.

Suitable silane ethers include those silanes having the formula

(I)

wherein Y is a hydroxyalkyl group (e.g. $HOCH_2CH_2$—, $HOC_4H_8$—, $HOC_8H_{16}$—, etc.), an acyloxyalkyl group (e.g. $CH_3COOCH_2CH_2$—, $CH_3CH_2COOCH_2CH_2CH_2$—, $CH_3COOC_4H_8$—, etc.), R' or —$RSi(R'_b)X_{4-(a+b)}$, R is a divalent organic group (preferably an alkylene group such as an ethylene, propylene or butylene group), R' is a monovalent hydrocarbon group free of aliphatic unsaturation (e.g. an alkyl or an aryl group), X is a hydrolyzable group that is non-reactive under the conditions employed in producing the graft copolymer [e.g. —OH, —$OCH_3$, $OC_6H_5$, acyloxy (acetoxy or propionyloxy group), fluorine, $(CH_3)_3CO$—, etc.], $a$ has a value from 1 to 3 inclusive, $b$ has a value from 0 to 2 inclusive, $(a+b)$ has a value from 1 to 3 inclusive, $m$ has a value of at least 2 and $n$ has a value of at least 2 (preferably $n$ has a value from 3 to 30). Typical of such silanes are $$HOCH_2(CH_2CH_2O)_2CH_2CH_2Si(OOCCH_3)_3$$

$$CH_3OCH_2CH_2CH_2OCH_2CH_2SiCH_3(OCH_3)_2$$

$$[CH_3COO(CH_2CH_2O)_3CH_2CH_2CH_2]_2Si(OC_6H_5)_2, \text{ etc.}$$

Suitable silicone-ether reactants of the siloxane variety include siloxanes consisting essentially of groups having the formula

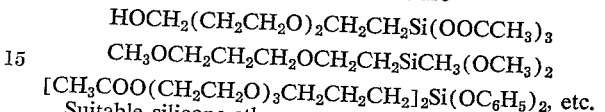

(II)

wherein Y' is a hydroxyalkyl group, an acyloxyalkyl group, R' or

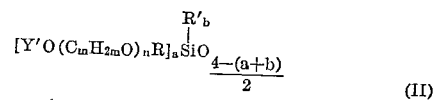

and R. R', $a$, $b$, $(a+b)$, $m$ and $n$ have the above-defined meanings.

Also included among the siloxanes that are useful as reactants in this invention are siloxanes consisting essentially of from 2 to 98 mole percent (preferably from 10 to 40 mole percent) of groups represented by Formula II above and from 2 to 98 mole percent (preferably from 60 to 90 mole percent) of groups having the formula

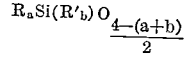

(III)

wherein R' has the meaning defined for Formula I and $c$ has a value from 1 to 3 inclusive.

It should be understood that the above-described siloxane-ether reactants often contain additional groups not shown in Formula I or II. Thus, these siloxanes can contain silicon-bonded acyloxy groups (e.g. acetoxy groups), hydroxyl groups and/or alkoxy groups (e.g. methoxy groups). In addition, organofunctional groups, such as halogen atoms or alkoxy groups, can be present as substituents on the silicon-bonded hydrocarbon groups.

Among the siloxane-oxyalkylene copolymers that are especially suited for use as reactants in this invention are those having the formula:

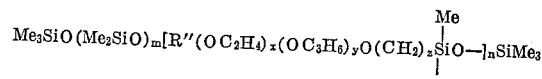

wherein $m$ has a value from 3 to 25 inclusive, $n$ has a value from 2 to 10 inclusive, $x$ has a value from 3 to 25 inclusive, $y$ has a value from 0 to 25 inclusive, $z$ has a value from 2 to 3 inclusive and R'' is an alkyl group containing from 1 to 4 carbon atoms inclusive.

The catalysts or free radical generators employed in this invention contain a peroxide group (—OO—) linked to a tertiary carbon atom (i.e. an aliphatic carbon atom that is linked to three other carbon atoms). Among the suitable catalysts are those represented by the formulae:

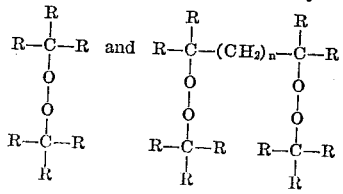

wherein R is an alkyl group or a phenyl group and $n$ is zero or an integer.

Preferred catalysts or free radical generators employed in this invention have the following formula:

$$Z_3COOZ'$$

wherein Z is an alkyl group (e.g. a methyl, ethyl, propyl or butyl group) or a phenyl group and Z' is hydrogen or —CZ$_3$. Illustrative of such peroxides are tertiary-butyl hydroperoxide, di-tertiary-butyl peroxide, di-cumyl peroxide, and the like. As used herein, "dicumyl peroxide" denotes a compound having the formula:

$$\begin{array}{ccc} & C_6H_5 & & C_6H_5 \\ & | & & | \\ CH_3-&C-O-O-&C-CH_3 \\ & | & & | \\ & CH_3 & & CH_3 \end{array}$$

The relative amount of the olefin, and the polyoxyalkylene compound employed in this invention is not narrowly critical. Thus, from .01 to 100 parts by weight of the olefin per part by weight of the polyoxyalkylene compound are preferred. More desirably, from 0.1 to 1 part by weight of the olefin per part by weight of the polyoxyalkylene compound are used. Other relative amounts of these compounds can be employed but no commensurate advantage is gained thereby.

In the practice of this invention, it is important that the olefin and the catalyst be added to the polyoxyalkylene compound slowly during the course of the grafting reaction.

Preferably the olefin and the catalyst are premixed prior to forming a reaction mixture thereof with the polyoxyalkylene compound. Then the admixture of the olefin and catalyst is added slowly to the oxyalkylene compound to permit the substantially complete reaction of each increment of the olefin with the polyoxyalkylene compound (or with the polyoxyalkylene portion of the graft copolymer formed in the reaction mixture) prior to the addition of the subsequent increment of olefin. In general, the olefin-catalyst admixture should be added to the polyoxyalkylene compound at a rate such that the ratio of the unreacted olefin to the total weight of the unreacted polyoxyalkylene compound and the graft copolymer in the reaction mixture does not exceed 1:5, preferably 1:100. Such a rate of addition minimizes homopolymerization of the olefin and also minimizes reactions between polyoxyalkylene compounds which can be catalyzed by high concentrations of the catalyst.

The temperature at which the grafting reaction is carried out in accordance with this invention will depend on the free radical inducing chemical compound (catalyst) employed and should be high enough to cause formation of free radicals in the reaction mixture. Suitable temperatures range from 90–225° C. with 150–200° C. being the preferred range. Generally, the use of a solvent will be advisable to insure a homogeneous solution, to reduce viscosity so as to avoid hot spots and to insure the rapid diffusion of added monomer throughout the reaction mixture. Such solvents, as for example benzene, toluene or xylene would limit the reaction temperature by refluxing. A higher boiling solvent would permit a higher temperature. The type of solvent is important only insofar as the starting materials must be mutually soluble therein and the solvent must be relatively inert to free radical attack. It is also desirable that the amount of solvent be sufficient to insure a homogeneous solution of the starting material at the reaction temperature. While the reaction can be carried out at atmospheric or superatmospheric pressure, there is usually no advantage to doing so.

While not wishing to be bound by any particular theory or mechanism, the grafting reaction involved in the process of this invention is thought to be initiated by the peroxide through abstraction of a hydrogen atom from the polyoxyalkylene compound. The polyoxyalkylene compound from which a hydrogen atom has been abstracted, now containing a free radical site along the polymer chain, reacts with an olefin by addition to the carbon-carbon double bond thereby forming an "activated" polyoxyalkylene compound containing a free radical site. Chain growth continues until the chain is terminated by abstraction of hydrogen from another polyoxyalkylene compound (chain transfer) or disproportionation or coupling of two growing polymer chains.

The resulting graft copolymer thus formed can be graphically illustrated as:

$$\begin{array}{c} W-W-W-W-W-W-W-W-W-W-W \\ | \quad\quad | \quad\quad | \quad\quad\quad\quad | \\ R \quad\quad R \quad\quad R \quad\quad\quad\quad R \\ R \quad\quad R \quad\quad\quad\quad\quad R \\ R \quad\quad\quad\quad\quad\quad\quad\quad\quad R \\ R \quad\quad\quad\quad\quad\quad\quad\quad\quad R \end{array}$$

wherein W represents a repeating unit of the polyoxyalkylene "backbone" polymer and R represents a unit derived from the olefin. It is apparent that polymer growth from the polyoxyalkylene "backone" polymer depends upon the formation of a free radical site along the backbone.

(A) $RO\cdot + C=C \rightarrow RO(CC)_x$
(B) $RO\cdot + WWWWWWWW \rightarrow ROH + WWWWWWWW$ In the above representation W represents a repeating unit of the polyether "backbone" polymer, RO· a peroxide fragment. If the growing polymer was initiated by the free radical generator, as in (A), then a homopolymer will be produced. If the free radical generator used is not capable of abstracting a hydrogen from the backbone, nor is the growing polymer, then no graft copolymer will be formed. For optimum efficiency both the peroxide fragment and the growing polymer should be capable of abstraction of a hydrogen from the "backbone" polymer, but even if the growing polymer cannot abstract the hydrogen from the "backbone" polymer, a grafted product low in homopolymer can be realized if the peroxide fragment can attack the "backbone" polymer, as in (B), provided the olefin is added slowly to the reactor containing the "backbone" polymer so that the concentration of monomer in the reactor is kept quite low. The azo compounds in general are poor abstractors of hydrogen and the acyl peroxide such as benzoyl peroxide are susceptible to induced decomposition by the ether.

The uniqueness of the process is the fact that it depends upon the peroxide to generate free radical sites on the backbone polymer. To do this efficiently and to keep the amount of homopolymer low, the olefin is added to the reactor at such a rate as to insure a low concentration of olefin in the reactor. If the olefin concentration in the reactor is too low, and an efficient peroxide such as di-tertiary butyl peroxide is used, i.e. a peroxide not subject to induced decomposition in the presence of ethers, the polyoxyalkylene radicals will couple and the system will gel. This tendency to gel in the absence of the olefin, is dependent upon the concentration of the polyoxyalkylene radical which in turn is dependent upon the peroxide concentration. This ability of the polyoxyalkylene compound to couple efficiently, even at 160° C., serves to demonstrate the stability of these radicals. Accordingly, both the olefin and the catalyst concentrations should be kept low.

It has been found that a rather unusual type of graft copolymer is produced when certain fluoro-olefins are reacted in accordance with the process of this invention. Such fluoroolefins are those having the formula:

$$CF_3(CF_2)_aCH=CH_2 \quad\quad\quad (IV)$$

wherein $a$ is an integer having a value from 1 to 20 (preferably from 1 to 5). Illustrative of the latter compounds are 3,3,3 - trifluoropropene-1,5,5,5,4,4,3,3-heptafluoropentene - 1,7,7,7,6,6,5,5,4,4,3,3 - undecafluoroheptene-1, and the like. An unusual feature of the graft copolymers prepared by grafting these fluoro-olefins onto the polyoxyalkylene compounds described above is that the fluoroolefins do not "homopolymerize" in the side chain to any significant degree (i.e. only one olefin molecule residue is present in most of the side chains in the graft copolymer). This results in the formation of graft copolymers having structures substantially as follows:

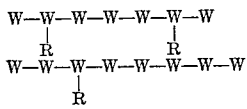

wherein W represents the repeating unit or units present in the polyether backbone and R is the fluorocarbon unit.

The above-described novel fluoro-olefin-polyoxyalkylene graft copolymers can also be produced by grafting the fluoroolefin to the polyoxyalkylene compound by conventional means. That is, the unique structure of these copolymers is independent of the process used to produce them. Examples 18, 19 and 20 below illustrate the production of these copolymers by known methods.

It is sometimes desirable to employ a portion of the polyoxyalkylene compound as a solvent for a premixture of the olefin and the peroxide. No undesirable reactions occur in such cases provided that the premixture is maintained at about ambient temperatures. Then the polyoxyalkylene-olefin-peroxide solution can be added slowly to the remainder of the polyoxyalkylene compound (which is heated to the reaction temperature) and the desired graft copolymer is produced.

The relative amount of peroxide catalyst employed in this invention is not narrowly critical. From 0.5 to 20 parts by weight of the peroxide per 100 parts by weight of the olefin are generally useful but from 1 to 10 parts by weight of the peroxide per 100 parts by weight of the olefin are preferred.

The graft copolymers produced in accordance with this invention can be used in a variety of areas. The copolymers are surfactants in aqueous systems and so can be used therein as wetting agents for paints, inks, mold release compositions, and the like. Those graft copolymers which have hydroxyl terminating groups on the polyoxyalkylene chain are useful as reactants ("polyols") in forming polyurethane foams having improved load-bearing properties. The graft copolymers are also useful as textile fiber and glass fiber lubricants and as metal to metal lubricants.

Although the process of this invention has been described wtih particular reference to grafting olefins to polyoxyalkylene compounds, it should be understood that this process is generally applicable to grafting olefins to any organic compound capable of undergoing grafting reactions (i.e. any compound containing a hydrogen atom bonded to an aliphatic carbon atom). In addition to polyoxyalkylene compounds, suitable reactants include polymers of vinyl methyl ether, poly(vinyl acetate), poly(vinyl alcohol), nylon and the like.

The following examples illustrate the present invention. In these examples the symbols used having the indicated meanings are:

| Symbol | Meaning |
|---|---|
| Me | $CH_3-$ |
| Ac | $CH_3CO-$ |
| Ml. | milliliter |

In the examples, all percentages are on a weight basis unless otherwise noted, "stripping" denotes heating at reduced pressure to remove volatile materials and "sparge" denotes passing an inert gas through a liquid, usually while heating the liquid, to aid in the removal of volatile materials.

EXAMPLE 1

A 500 millimeter, 3-neck round bottom flask was fitted with a mantle, agitator, thermometer, dropping funnel, reflux condenser and an inert gas guard. The flask was flushed with nitrogen and was charged with 25 grams (0.0685 mole) of the silane

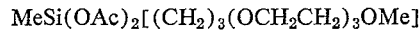

and 50 grams of diphenyl ether solvent. The contents of the flask were heated to 160° C., and an admixture of 75 grams (0.72 mole) of styrene and 7.5 grams (0.005 mole) of di-tertiary-butyl peroxide was added dropwise to the flask over a two hour period. After the two hour period, an aliquot portion of the flask contents was stripped free of unreacted styrene, peroxide, peroxide fragments, and diphenyl ether solvent and unreacted siloxane to give a yield of 93.5% of a graft copolymer. The graft copolymer contained 1.2±0.3% Si while the siloxane reactant contained 7.8 Si±0.3% Si. The graft copolymer was a viscous, clear, hazeless fluid.

Sixty six grams of the graft copolymer produced as described above was heated with 370 grams (0.1 mole) of an oxyalkylene compound having the average formula $HO(CH_2CH_2O)_{42}(C_3H_6O)_{32}OC_4H_9$. Toluene was used as a solvent and the acetic acid, evolved as the result of the following reaction between the graft copolymer and the oxyalkylene compound:

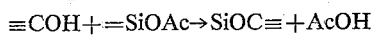

was removed from the reaction mixture as a toluene azeotrope. The course of the reaction was followed by infrared scanning of the azeotrope to observe the disappearance of the carbonyl group. The "adduct" so produced stripped free of the toluene was a clear, viscous, hazeless fluid.

258.5 grams of the "adduct" was added to one gallon of methanol to precipitate any polystyrene homopolymer that might be present. A slight opalescence developed but no material precipitated from the solution even after prolonged standing. The material was quite soluble in water, and as in the case of the methanol, had a slight opalescence. Polystyrene is insoluble in both methanol and water and the above results serve to indicate no appreciable amount of polystyrene homopolymer was present.

The graft copolymer was insoluble in methanol but was solubilized in methanol by the reaction with the oxyalkylene compound. However, a low molecular weight unmodified polystyrene, Piccolastic D-100 (Pennsylvania Industrial Chemical Corporation) of approximately 1,500 molecular weight was not solubilized by mixing with the adduct and dispersing the mixture in methanol. This serves to demonstrate that, if styrene homopolymer had been present in the graft copolymer, it would have been recovered as a precipitate from methanol after the adduct formation.

EXAMPLE 2

To a 500 ml. 3 neck flask fitted as in Example 1 were charged:

25.7 grams of polyethylene oxide (~0.0734 moles) having the formula $HO_1CH_2CH_2O)_8Me$,
24.7 grams of xylene, and
52.3 grams of diphenyl ether The contents of the flask were heated to 200° C. to remove xylene and any water that might be present and then cooled to 160° C. An admixture of 76 grams of inhibitor-free styrene and 7.5 grams of ditertiary butyl peroxide was added dropwise to the flask over one and one-half hours. The reaction mixture was stripped free of peroxide fragments, unreacted styrene and the diphenyl ether solvent to recover 100.8 grams (100% yield) of a graft copolymer. The copolymer was hazeless and a solid at room temperature. In as much as polystyrene and the polyethylene oxide are immissible, the fact that a clear hazeless adduct was obtained is quite good evidence that no great amount of homopolymer is present. The 20 grams of the stripped copolymer was dissolved in benzene and heated with 2.5 grams of a polymethyl-hydrogensiloxane having the average formula:

with a catalytic amount of $H_2PtCl_6$ and $SnCl_2 \cdot 2H_2O$. This formed a gel by the reaction ≡SiH+HOC→≡SiOC+H₂ where the SiH was in the siloxane and the COH in the copolymer. The gel was extracted with benzene to recover 2.4 grams (12.7 wt. percent) of the material whose infrared absorption showed to be like the original copolymer (strong OH, polystyrene and organic ether absorption). Another 0.5 gram of the siloxane was added, the mixture heated, and then 4 drops of glycerine added to crosslink to form a second gel. This second gel was extracted with benzene to recover 0.4 gram of a material (2 wt. percent) of the original sample). Again, the infrared scan showed the material to be the graft copolymer. Thus apparently there is less than 2 wt. percent of polystyrene homopolymer in these graft copolymers since polystyrene is soluble in benzene and so would have been extracted if present.

EXAMPLE 3

To a 500 ml., 3 neck flask round bottom, fitted as in Example 1 were charged:

25.8 grams of polypropylene oxide, HO(C₃H₆O)ₓH, and 101 grams of diphenyl ether solvent.

The flask was flushed with nitrogen, heated to 170° C. and an admixture of 75 grams of styrene and 7.5 grams of ditertiary-butyl peroxide was added to the flask over a 65 minute period to produce a graft copolymer. Then a mixture of 19.2 grams of 25% divinyl benzene solution and 3 grams of di-tertiary butyl peroxide was added to the flask in an attempt to gel the system by grafting the divinyl benzene to the graft copolymer. The flask contents thickened but did not gel. 2.2 grams of MeSi(OAc)₃ was added to the flask at 150° C., causing the flask contents to gel in 30 seconds due to the reaction:

≡SiOAc+HOC≡→≡SiOC+HOAc

The gelled material was transferred to an evaporator and volatile materials were removed by volatilization at 250 and 300 microns of mercury pressure. 111.7 grams of devolatilized gel were recovered. 81.4 grams of this gel was extracted with benzene three times to recover 16.9 grams, 2.8 grams, 1 gram and 0.4 gram of material (successive extractions) for a total of 21.1 grams extracted. This material was gelled with the polymethyl-hydrogen siloxane used in Example 2. After extraction, 8.6 grams of extracted material were recovered. This material was grafted with maleic anhydride and then crosslinked to a hard gel with glycerine. 1.8 grams were extracted from this last gel which amounted to 2.2 wt. percent of the original material. The infrared absorption showed the presence of hydroxyl, carbonyl, polystyrene and organic ethers. Again little homopolymer had been produced.

EXAMPLE 4

To demonstrate the utility of polyethers grafted with styrene, styrene was grafted to a trihydroxypolypropylene oxide having the formula

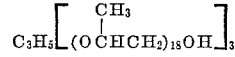

where C₃H₅ is derived from glycerol. To this polyether was grafted 35 weight percent of styrene (based on weight of copolymer) and this grafted material used in the manufacture of a polyurethane foam. The foam had improved load deflection.

To a two liter, 3 neck, round bottom flask fitted as in Example 1, was charged 447.6 grams of the trihydroxypolypropylene oxide. The flask was heated to 170° C. An admixture of 476.7 grams of inhibitor-free styrene and 23.8 grams of di-tertiary-butyl peroxide was added dropwise to the flask in 50 minutes (no reaction occurred in the admixture till it was added to the flask since the admixture was at room temperature). When the addition had been completed, the contents of the flask were heated to 190° C. with a vigorous nitrogen sparge to remove peroxide, peroxide fragments and any unreacted styrene.

A 99% yield of a graft copolymer material having a viscosity of 58,700 cstks. was obtained. The fluid had a very slight haze. This reaction shows the use of a portion of the polyoxyalkylene compound as a solvent for the components of the olefin-peroxide premixture.

The graft copolymer so produced was used as the "polyol" reactant in producing a polyurethane foam. In place of the graft copolymer, a polyol having the formula C₃H₅[(OC₃H₆)₂₈OH]₃ was used in a control formulation to approximate the crosslinking density achieved by the graft copolymer. The formulations were:

| | Parts by weight |
|---|---|
| Graft copolymer or control polyol | 100 |
| Water | 4 |
| TMBDA [1] | 0.1 |
| N-ethyl morpholine | 0.2 |
| Surfactant [2] | 1.20 |
| Stannous octoate | 0.3 |
| Tolylene diisocyanate (control) | 43.68 |
| Tolylene diisocyanate (graft copolymer) | 44.26 |

[1] N,N,N',N'-tetramethyl 1,3-butane-diamine.

[2] Me₃SiO(Me₂SiO)₂₁[Bu(OC₂H₄)₁₈(OC₃H₆)₁₄OC₃H₆SiO-]₃,₅SiMe₃ with Me side group

The formulations were foamed and cured by conventional methods. The control foam had a 6.4 inch rise and a cell count of 50–53 per inch, while the graft copolymer composition had a rise of 7.4 inches and a cell count of 60 per inch.

Samples of both foams were tested for instantaneous load of deflection with the following results:

| Load, lb./in.² | Control deflection, percent | Graft copolymer deflection, percent |
|---|---|---|
| 2.5 | 35 | 10 |
| 5 | 64 | 42 |

It is obvious that the grafting of styrene to one component of polyurethane foam formulation markedly altered the load bearing characteristics of that foam.

EXAMPLE 5

To a 500 ml. round bottom, 3 neck flask fitted as in Example 1, was charged 200 grams of a monohydroxyl polyether having the average formula:

HO(C₂H₄O)₂₀(C₃H₆O)₁₅.₅C₄H₉ and 100 grams of toluene. The ether was heated to 170° C., removing toluene as it boiled up to dehydrate the system, then cooled to 160° C. and an admixture of 50 grams of inhibitor free styrene and 5 grams of di-tertiary-butyl peroxide was added dropwise to the flask in 25 minutes. After the styrene addition had been completed, the flask was heated to 190° C., then sparged vigorously with nitrogen to remove lites. 245 grams (98% yield) of a hazeless graft copolymer was obtained having a viscosity of 1252 cstks. at 25° C. The viscosity of the polyether starting material alone was 270 cstks. The graft copolymer was soluble in water (as is the polyether starting material) while polystyrene is not. The infrared absorption of the graft copolymer show no increase in carbonyl absorption as compared to the polyether starting material alone indicating no scission of the ether. A 1 weight percent aqueous solution of the graft copolymer had a surface tension of 35.3 dynes/cm. and formed a stable emulsion with toluene.

EXAMPLE 6

To a 500 ml., 3 neck, round bottom flask fitted as in Example 1 was charged 201.3 grams of the polyether used in Example 5 and 50.7 grams of inhibitor free styrene and 5 grams of di-tertiary-butyl peroxide. The flask was heated to 167–170° C. An exotherm was noted and the flask contents became hazy. After 11 minutes the flask was heated to 190° C. with a vigorous nitrogen sparge to remove lites and unreacted styrene. 249.4 grams (yield 99+) was recovered of a very hazy product having a viscosity of 2716 cstks. and was insoluble in water. Quite evidently very little if any copolymer was formed and a dispersion of polystyrene in the polyether was realized. This shows the importance of slowly adding the styrene to the polyether.

EXAMPLE 7

To a 500 ml., 3 neck round bottom flask fitted as for Example 1, was charged 201.1 grams of the polyether used in Example 5. This polyether was sparged to 170° C. to dehydrate and an admixture of styrene (stabilized with tertiary-butyl-pyrocatechol) and 10 grams of di-tertiary-butyl peroxide was added to the polyether at 168–172° C. over a 2 hour 15 minute period. The flask contents were then sparged to 190° C. 303.7 grams (99%+yield) of graft copolymer was recovered, which was clear and hazeless. The viscosity of the copolymer was 28,500 cstks. at 25° C. This copolymer contained 34.3 weight percent of polystyrene yet dissolved in water (with slight haze) as readily as the polyether reactant.

EXAMPLE 8

To a 500 ml., 3 neck flask fitted as in Example 1, was charged 100 grams of polyether having the average formula: $HO(C_3H_6O)_{34.5}H$. The ether was dehydrated by sparging to 180° C. with nitrogen, then a mixture of 5 grams of di-tertiary butyl peroxide, 102.2 grams of the polyether, 101.7 grams of styrene containing tertiary butyl pyrocatechol was added dropwise at 175–180° C. over a 32 minute period. Thereafter the flask contents were sparged to 195° C. 299.7 grams was recovered (99% +yield) of a clear hazeless graft copolymer.

EXAMPLE 9

Charged to a 2 liter, 3 neck round bottom flask fitted as in Example 1, 758.3 grams of the trihydroxypolypropylene oxide used in Example 4. The ether was heated to 170° C., and a mixture of 304 grams of vinyl acetate, 101.3 grams of the trihydroxypolypropylene oxide used in Example 4 and 19 grams of di-tertiarybutyl peroxide was added dropwise to the flask over 2 hours and 25 minutes to produce a graft copolymer. After the addition was completed, the graft copolymer was heated to 190° C. and sparged vigorously with nitrogen to remove lites and unreacted monomer. A 96% recovery of the graft copolymer was realized. Thus on a weight balance 267.9 grams of vinyl acetate was grafted to 859.6 grams of polyether to form a graft copolymer containing 23.75 weight percent of vinyl acetate. The graft copolymer was clear, hazeless and had a light yellow color with a viscosity of 983.7 cstks.

EXAMPLE 10

To a 500 ml., round bottom, 3 neck flask fitted as in Example 1, was charged 106.9 grams of the trihydroxypolypropylene oxide used in Example 4. The contents of the flask were heated to 180° C. and a mixture of 105.6 grams of the trihydroxypolypropylene oxide used in Example 4, 77.6 grams of ethyl acrylate containing 15 p.p.m. of a polymerization inhibitor, and 8.3 grams of di-tertiary-butyl peroxide was added over a two hour period. After the addition was completed, the product was heated to 195° C. with a vigorous nitrogen sparge. 193 grams of a clear, hazeless, slightly yellow fluid (graft copolymer) was recovered (96.5% yield).

EXAMPLE 11

To a 1 liter, round bottom, 3 neck flask fitted as in Example 1, was charged 200 grams of the trihydroxypolypropylene oxide used in Example 4 which was heated to 180° C. Over a 55 minute period a mixture of 195 grams of the trihydroxypolypropylene oxide used in Example 4 (used here as a solvent), 40 grams of acrylonitrile (inhibitor free) and 4 grams of di-tertiary-butyl peroxide was added dropwise to the flask. After the addition was complete, the flask was heated to 190° C. and sparged vigorously to remove lites (volatile materials). 429 grams of graft copolymer was recovered (98.7% yield). The graft copolymer was quite dark but hazeless and had a viscosity of 1,115 cstks. at 25° C. Because of the insolubility of polyacrylonitrile in polyethers, the fact that a haze free adduct was obtained is good evidence of no polyacrylonitrile homopolymer.

EXAMPLE 12

The trihydroxypolypropylene oxide used in Example 4 (200 grams) was charged to a flask and heated to 180° C. A mixture of 196 grams of the trihydroxypolypropylene oxide used in Example 4 (used here as a solvent), 4 grams of di-tertiary butyl peroxide and 40 grams of inhibitor free methacrylonitrile was added to the flask over a 45 minute period to the flask. The product was stripped by heating to 190° C. using a nitrogen sparge. A slightly hazy, dark graft copolymer (410.2 grams) was recovered. Apparently 35.5 weight percent of the nitrile polymerized, to be retained in the polyether as graft copolymer.

EXAMPLE 13

To a 500 ml., 3 neck flask fitted as in Example 1, was charged 25.5 grams of polyalkylene oxide having the formula: $CH_3COO(C_2H_4O)_8Me$, 75.4 grams of inhibitor free styrene, 100 grams of benzene, and 1.1598 grams of diazobisisobutyronitrile. The homogeneous solution was heated to 50–70° C. for 10 hours. 44.9 grams of the solution was added to methanol, the insoluble polystyrene filtered free of the methanol, dissolved in 200 grams of benzene and precipitated by slowly adding to methanol once again. The solids were filtered free of methanol and desolvated. 7.4 grams of polystyrene was recovered whose infrared absorption pattern showed no evidence of the presence of carbonyl groups or an organic ether. Hence no grafting had occurred.

EXAMPLE 14

To a 500 ml., 3 neck flask fitted as in Example 1 was charged 25 grams of the polyalkylene oxide used in Example 13 and 100 grams of diphenyl ether as solvent. The head space was flushed with $N_2$ and contents of the flask heated to 160° C. A mixture of 75 grams of styrene (distilled free of inhibitor) and 7.5 grams of di-tertiary butyl peroxide was added dropwise to the flask over a 45 minute period. Heating was continued for an additional half hour, after which a 76.2 grams aliquot was desolvated at elevated temperature and reduced pressure. 36.4 grams of solids was recovered. This material was dissolved in 200 grams of benzene and added to one gallon of methanol. A precipitate formed. The methanol insoluble material was filtered free of the methanol, dissolved in 200 grams of benzene and re-precipitated in a second gallon of methanol. The solids were again filtered free of methanol and desolvated at elevated temperature and reduced pressure. The infrared absorption pattern of this material clearly showed the presence of organic carbonyl and organic ethers. Hence, grafting had occurred.

To demonstrate the relative effectiveness of dibenzoyl peroxide and di-tertiary butyl peroxide in initiating grafting of styrene to a siloxane-polyether copolymer, both peroxides were used in the same manner and concentrations in the Examples 15 to 17.

EXAMPLE 15

To a 500 ml. round bottom flask fitted with an agitator, thermometer, Dean Stark trap, reflux condenser, an inert gas guard, dropping funnel, was charged 25 grams of the compound $(Me_3SiO)_2SiMe(CH_2)_2(OCH_2CH_2)_3OMe$ and 100 grams of xylene. The flask was heated to 90° C and a mixture of 75 grams of inhibitor free styrene and 16.5 grams of dibenzoyl peroxide (0.066 mole) in 43 grams of xylene was added dropwise to the flask in 70 minutes. The reaction mixture was stripped free of solvent and a 20.1 gram portion purified by dissolving in benzene, adding the benzene solution to methanol to precipitate the graaft copolymer and filtering to isolate the copolymer. After two such precipitations, 6.9 grams of methanol insoluble material (graft copolymer) was recovered, analyzed and found to contain 0.8±0.2% Si (average of two analyses).

EXAMPLE 16

The procedure was the same as for Example 15 except 20 grams of xylene was used as solvent in the flask and the flask temperature was 160° C. To the flask a mixture of 75 grams of inhibitor free styrene and 10 grams of di-tertiary-butyl peroxide (0,0685 mole) was added dropwise over 100 minutes. The reaction mixture was solvent stripped and a 20 gram sample purified by precipitation as in Example 15. 7.9 grams of methanol insoluble graft copolymer was recovered, analyzed and found to contain 2.0±0.2% Si.

EXAMPLE 17

The precedure was the same as Example 15 except that 1 gram of di-tertiary-butyl peroxide was used (0.0068 mole). The graft copolymer contained 0.8±0.2 Si (average of two analyses).

It is obvious that di-tertiary peroxide is at least ten times more effective in grafting styrene to a polyether than is dibenzoyl peroxide.

EXAMPLE 18

To a 300 ml. rocking autoclave (bomb) was added 14.5 grams $CF_3CF_2CF_2$—CH=$CH_2$ (B.P.=31° C.), 85.5 grams of a polyalkylene oxide having the average formula $HO(C_2H_4O)_{42}(C_3H_6O)_{31.9}C_4H_9$ and 8.5 grams of di-tertiary-butyl peroxide. The bomb was sealed and heated to 150° C. for 3 hours. After cooling 104.7 grams of a translucent viscous product was achieved. After stripping of the product of lights, 93.3 grams of graft copolymer were recovered. Cloud point of a 1 weight percent solution in was was 41° C. Surface tension of this solution was 23.7 dynes/cm. (corrected). Analysis of the product (graft copolymer) showed carbon=55.1%; H=8.8%; F=7.9%.

EXAMPLE 19

To a 300 ml. rocking autoclave (bomb) was added 14.5 grams of $CF_3CF_2CF_2$—CH=$CH_2$ (B.P.=31° C.), 85.5 grams of the trihydroxypolypropylene oxide used in Example 4 and 8.5 grams of di-tertiary-butyl peroxide. The bomb was sealed and heated to 150° C. for 3 hours. After cooling 105.6 grams of a yellow liquid product was collected. Charged 103.9 grams of this liquid to a flask to strip the lights. After stripping, 89.7 grams of product remained. Viscosity=358.1 cstks. Analysis of stripped product (graft copolymer) was F=7.1%.

EXAMPLE 20

To a 300 ml. rocking autoclave (bomb) was added 14.5 grams $CF_3CF_2CF_2$—CH=$CH_2$, 85.5 grams of the polyether having the average formula:

$$C_3H_5[(OC_3H_6)_{57}OH]_2$$

and 8.5 grams of di-tertiary-butyl peroxide. The bomb was sealed and heated to 150° C. for 3 hours. After cooling 101.8 grams of product was collected. After stripping of lights under vacuum 86.9 grams of 100 grams charged was recovered. Viscosity of product (graft copolymer)=462.7 cstks. Analysis showed fluorine=7.1%.

EXAMPLE 21

A fluid vinylsiloxane-methylsiloxane-trimethylsiloxane cohydrolyzate having a viscosity of 116 centipoises at 25° C. and $n_D^{25}$=1.4188 was prepared by cohydrolysis of 163 g. (1.5 moles) of trimethylchlorosilane, 80.7 g. (0.5 mole) of vinyltrichlorosilane and 74.7 g. (0.5 mole) of methyltrichlorosilane. This material was used to make a siloxane-oxyalkylene graft copolymer as follows:

In a three-necked flask equipped with stirrer, reflux condenser and dropping funnel there was placed 60 g. of xylene and 60 g. of a tris-polyoxypropylene monoglycerol ether having an average molecular weight of 3000, a viscosity of 660 centipoises at 20° C. and a hydroxyl number of 56. Sufficient xylene was removed from the flask by distillation to bring the reflux temperature to 165° C. There was then added dropwise with stirring over a three hour period a solution of 2 g. of di-t-butyl peroxide catalyst dissolved in 20 g. of the vinyl-containing cohydrolyzate described above, holding the temperature of the reaction flask in the range of 155–165° C. After removal of the solvent and low boiling material the resulting clear fluid oil (graft copolymer) had a viscosity of 1470 centipoises at 25° C.

The above siloxane-oxyalkylene graft copolymer was effective in stabilizing polyurethane foam formulations.

EXAMPLE 22

An allylsiloxane-trimethylsiloxane cohydrolyzate was prepared by the addition of 100 g. (0.57 mole) allyltrichlorosilane and 124 g. (1.14 moles) of trimethylchlorosilane to a mixture of 160 g. of sodium carbonate in 500 ml. of water and 200 ml. of diisopropyl ether. External cooling was used to hold the temperature at 10° C. during the addition. After water washing, filtration and removal of the low boiling material by sparging to 205° C. with nitrogen there was obtained a colorless clear neutral cohydrolyzate having a viscosity of 22 cps. at 23° C. and a refractive index of 1.4247 at 25° C. This cohydrolyzate was used in preparing a siloxane-oxyalkylene graft copolymer as follows:

A mixture of 100 g. of the oxyalkylene polymer $HO(C_2H_4O)_x(C_3H_6O)_yC_4H_9$ (mol. wt. 2000 and weight percent $C_2H_4O$ equals weight percent $C_3H_6O$), and 100 grams of reagent grade xylene was dehydrated azeotropically as 72 ml. of xylene was distilled off to attain a solution temperature of 160° C. A solution of 3.3 grams of di-tertiary butyl peroxide in 33.3 grams of the above allylsiloxane-trimethylsiloxane cohydrolyzate was added dropwise over 70 minutes to the stirred xylene solution of oxyalkylene polymer while maintaining a temperature between 151° and 160° C. After an additional 30 minutes at 151° C. the solvent was removed with a nitrogen sparge up to a temperature of 180° C. The resulting clear homogeneous graft copolymer had a viscosity of 960 cps. at 23° C. and $n_D^{25}$=1.4590. This copolymer readily dissolved in water to yield a faintly turbid solution.

EXAMPLE 23

The monohydroxy polyoxyalkylene monobutyl ether employed in Example 22 was converted to a monoacetoxy ester by reaction with excess acetic anhydride at 160° C. for 4 hours and removal of low boiling material. Infrared spectral analysis indicated the complete absence of hydroxyl groups and showed a strong ester carbonyl absorption. A silixane-oxyalkylene graft copolymer having a viscosity of 776 cps. at 23° C. and $n_D^{25}$=1.4537 was prepared by reacting 100 g. of the above monoacetoxy terminated oxyalkylene polymer with 33.3 g. of an equilibrated vinyl-modified dimethylpolysiloxane fluid having an average of 3 vinyl groups per molecule (average mol. wt. 800) using the procedure outlined in Example 22. This copolymer was found to be useful in the stabilization of polyurethane foam formulations.

As used herein, the terms "olefin" and "olefinic compound" denote a compound containing an aliphatic carbon-to-carbon double bond (i.e. a bond such as is present in styrene and vinyl chloride). Such compounds can, of course, contain any of a wide variety of constituents in addition to the olefinic double bond. Thus, they can contain aryl groups, silyl groups, organic ester groups, etc. as indicated by the numerous illustrative olefins set forth hereinabove.

What is claimed is:
1. A process for producing olefin-polyoxyalkylene graft copolymers which process comprises slowly and simultaneously adding (a) an alpha-olefin and (b) a peroxide containing a peroxide group linked to a tertiary carbon atom bonded to from 2 to 3 alkyl groups and from 0 to 1 phenyl groups to (c) a polyoxyalkylene compound which is maintained at a temperature sufficiently elevated to cause a graft copolymer of the olefin and the polyoxyalkylene compound to be produced.
2. The process of claim 1 wherein the alpha-olefin is a hydrocarbon containing only one olefinic bond.
3. The process of claim 1 wherein the polyoxyalkylene compound is represented by the formula

$$R''[(OC_nH_{2n})_zOR']_a$$

wherein R'' is a hydrocarbon radical free of aliphatic unsaturation and having a valence of $a$, $a$ is an integer having a value of at least 1, R' is a member selected from the group consisting of a monovalent hydrocarbon radical free of aliphatic unsaturation, a hydrogen atom and an acyl radical free of aliphatic unsaturation, $n$ has a value from 2 to 4 inclusive, $z$ is an integer having a value from 0 to 200 inclusive and at least one member represented by $z$ has a value of at least 2.
4. The process of claim 1 wherein the polyoxyalkylene compound is represented by the formula $$Me_3SiO(Me_2SiO)_m[R''(OC_2H_4)_x(OC_3H_6)_yO(CH_2)_z\overset{Me}{\underset{|}{Si}}O-]_n-SiMe_3$$

wherein $m$ has a value from 3 to 25 inclusive, $n$ has a value from 2 to 10 inclusive, $x$ has a value from 3 to 25, $y$ has a value from 0 to 25 inclusive, $z$ has a value from 2 to 3 inclusive and R'' is an alkyl group containing from 1 to 4 carbon atoms inclusive.
5. The process of claim 1 wherein the alpha-olefin is a member of the group consisting of styrene, vinyl acetate, ethyl acrylate, acrylonitrile, methacrylonitrile and a vinyl halide and wherein the polyoxyalkylene compound is a siloxane consisting essentially of from 2 to 98 mole percent of groups represented by the formula:

$$[Y'O(C_mH_{2m}O)_nR]_a\overset{R'_b}{\underset{|}{Si}}O_{\frac{4-(a+b)}{2}}$$

wherein Y' is a hydroxyalkyl group, an acyloxyalkyl group, R' or $$R' \text{ or } -RSi(R')O_{\frac{4-a+b}{2}}$$

R is an alkylene group, R' is a monovalent hydrocarbon group free of aliphatic unsaturation, $a$ has a value from 1 to 3 inclusive, $b$ has a value from 0 to 2 inclusive, $(a+b)$ has a value from 1 to 3 inclusive, $m$ has a value of at least 2 and $n$ has a value of at least 2; and from 2 to 98 mole percent of groups having the formula:

$$R'_cSiO_{\frac{4-c}{2}}$$

therein R' has the above defined meaning and $c$ has a value from 1 to 3 inclusive.
6. The process of claim 1 wherein the alpha-olefin is a siloxane consisting essentially of at least two groups having the formula $$R_a\overset{R'_b}{\underset{|}{Si}}O_{\frac{4-(a+b)}{2}}$$

where R is an olefinically unsaturated monovalent hydrocarbon group, R' is a monovalent hydrocarbon group free of aliphatic unsaturation, $a$ has a value from 1 to 3 inclusive, $b$ has a value from 0 to 2 inclusive and $(a+b)$ has a value from 1 to 3 inclusive.
7. The process of claim 1 wherein the alpha-olefin is a siloxane consisting essentially of 2 to 98 mol percent of the siloxane groups defined in claim 6 and from 2 to 98 mol percent of groups having the formula $$R'_cSiO_{\frac{4-c}{2}}$$

wherein R is a monovalent hydrocarbon group free of aliphatic unsaturation and $c$ has a value of from 1 to 3 inclusive.
8. The process of claim 1 wherein the peroxide has the formula $$Z_3COOZ'$$

wherein Z is a member selected from the group consisting of the alkyl groups and the phenyl group and Z' is a member of the group consisting of hydrogen and $-CZ_3$.
9. The process of claim 1 wherein the peroxide is dicumyl peroxide.
10. The process of claim 1 wherein the peroxide is ditertiary butyl peroxide.
11. The process of claim 5 wherein the alpha-olefin is styrene.
12. The process of claim 8 wherein each Z is an alkyl group.
13. A graft copolymer produced by grafting an alpha-olefin having the formula $$CF_3(CF_2)_aCH=CH_2$$

where $a$ is an integer having a value from 1 to 20, to a polyoxyalkylene compound represented by the formula $$R''[(OC_nH_{2n})_zOR']_a$$

wherein R'' is a hydrocarbon radical free of aliphatic unsaturation and having a valence of $a$, $a$ is an integer having a value of at least 1, R' is a member selected from the group consisting of a monovalent hydrocarbon radical free of aliphatic unsaturation, a hydrogen atom and an acyl radical free of aliphatic unsaturation, $n$ has a value from 2 to 4 inclusive, $z$ is an integer having a value from 0 to 200 inclusive and at least one member represented by $z$ has a value of at least 2, said graft copolymer containing only one olefin molecule residue present in most of the side chains formed on the polyoxyalkylene compound by the grafting of the olefin thereto.

References Cited

UNITED STATES PATENTS

| | | | |
|---|---|---|---|
| 2,958,707 | 11/1960 | Warrick | 260—448.2 |
| 3,075,948 | 1/1963 | Santelli | 260—455 |
| 3,189,549 | 6/1965 | Emrick, et al. | 252—52 |
| 3,137,737 | 6/1965 | Emrick, et al. | 260—611 |

FOREIGN PATENTS 874,130  8/1961  Great Britain.

OTHER REFERENCES

Freeman, "Silicones," Iliffe Books Ltd. (1962) p. 1.

TOBIAS E. LEVOW, *Primary Examiner.*

J. P. PODGORSKI, *Assistant Examiner.*

U.S. Cl. X.R.

260—2.5, 46.5, 92.1, 611, 613, 615, 827, 874, 896, 898, 899, 900, 901.

UNITED STATES PATENT OFFICE
CERTIFICATE OF CORRECTION

December 24, 1968

Patent No. 3,418,354

Marshall L. Wheeler, Jr.

It is certified that error appears in the above identified patent and that said Letters Patent are hereby corrected as shown below:

Column 15, lines 55 to 57, the formula should appear as shown below:

$$-R_a Si(R'_b) O \frac{4-(a+b)}{2}$$

Signed and sealed this 17th day of March 1970.

(SEAL)
Attest:

Edward M. Fletcher, Jr.
Attesting Officer

WILLIAM E. SCHUYLER, JR.
Commissioner of Patents